United States Patent Office 3,429,784
Patented Feb. 25, 1969

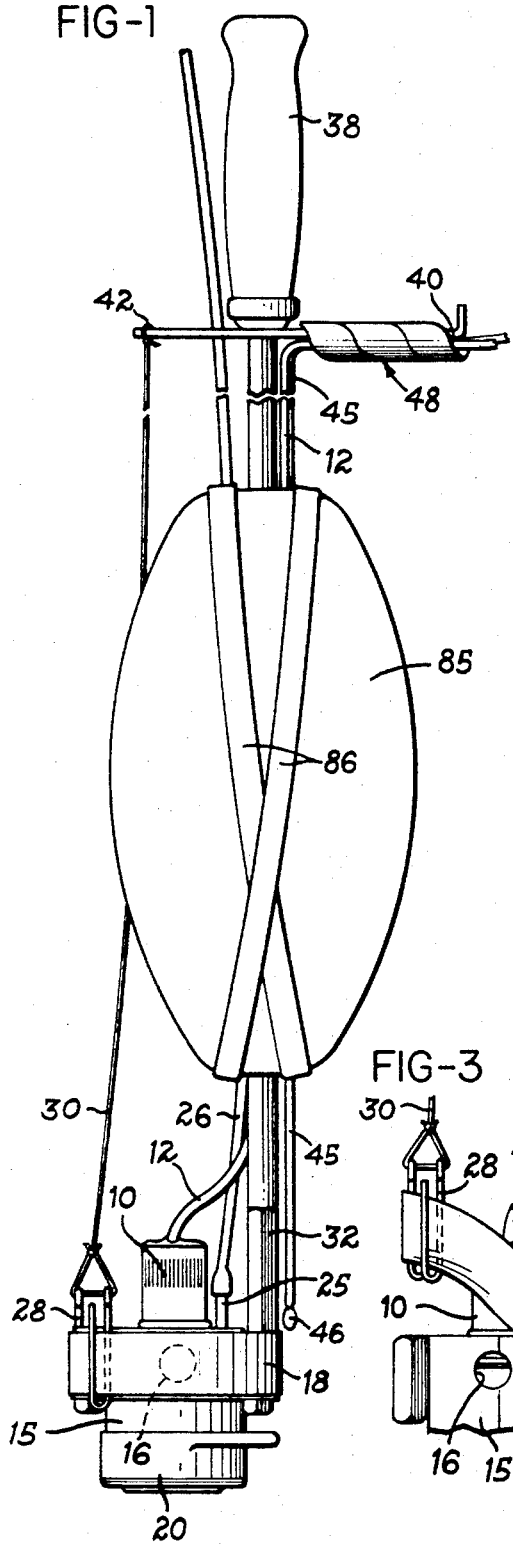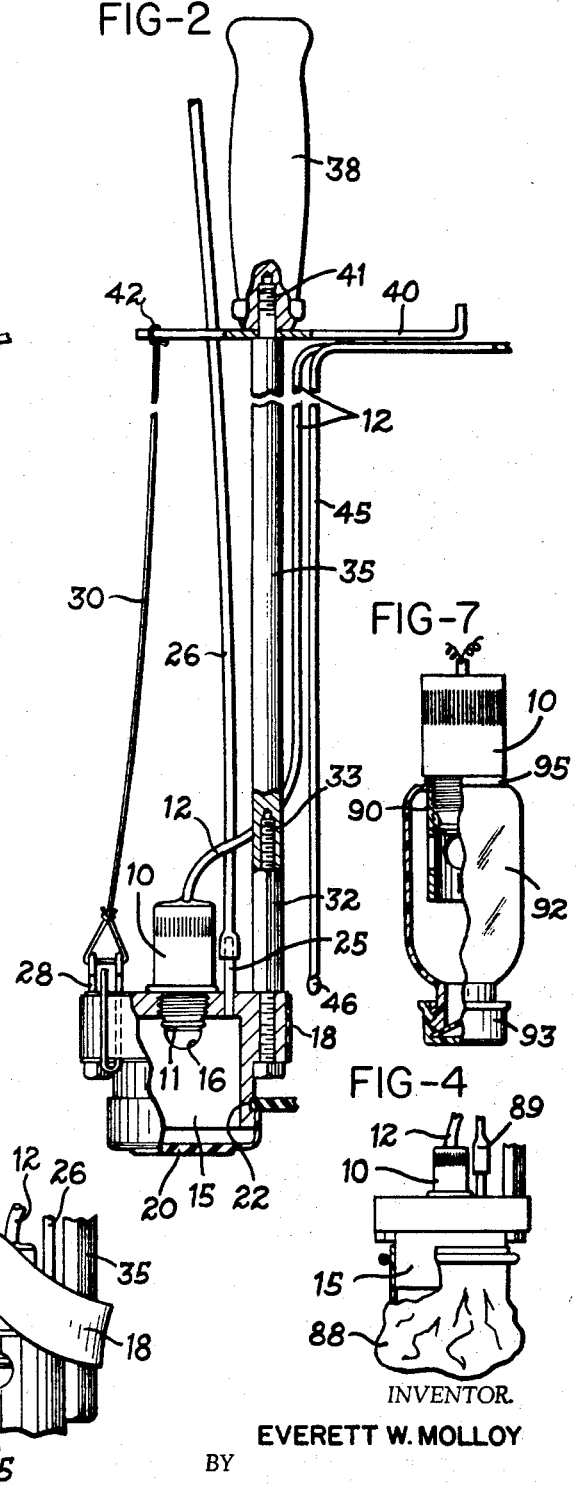
INVENTOR.
EVERETT W. MOLLOY
BY
Marechal, Biebel, French & Bugg
ATTORNEYS

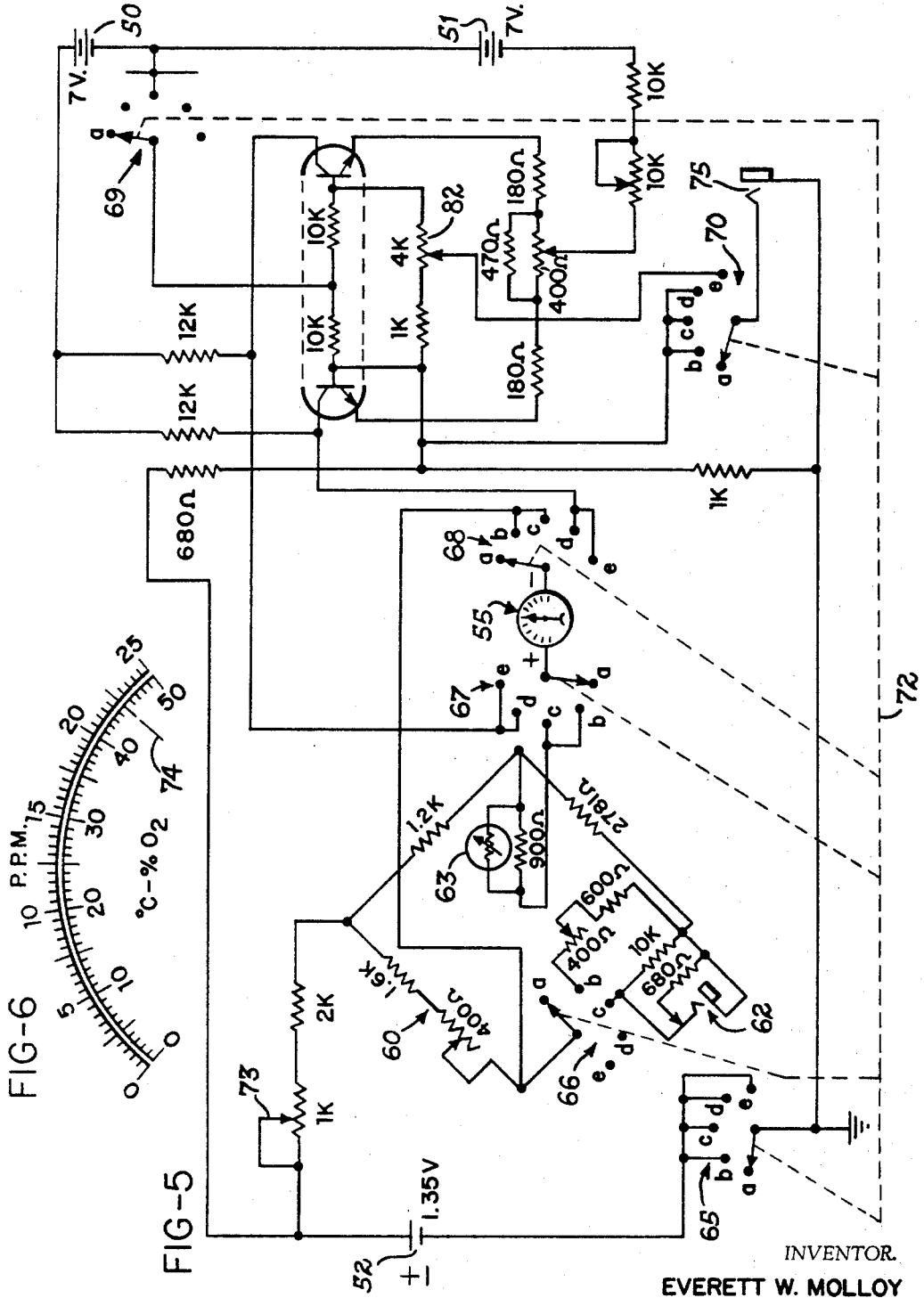

3,429,784
METHOD AND APPARATUS FOR MEASURING GAS CONTENT
Everett W. Molloy, Yellow Springs, Ohio, assignor to The Yellow Springs Instrument Company, Inc., Yellow Springs, Ohio, a corporation of Ohio
Filed Jan. 13, 1964, Ser. No. 337,246
U.S. Cl. 204—1          6 Claims
Int. Cl. B01k 3/02; B01l 5/00

ABSTRACT OF THE DISCLOSURE

A polarographic cell with a covering membrane permeable to a gas to be measured comprising a housing forming a test chamber around the cell and a temperature probe supported externally thereof. A float and depending rod support the housing and temperature probe, and a vent from the housing admits atmospheric air into the housing. The housing is first immersed into the sample fluid and an indicator connected to the cell is compensated according to known response of the cell at the indicated temperature, then a normally closed port in the housing is opened to admit the sample fluid.

---

This invention relates to apparatus for measuring the quantity of a gas, such as oxygen, in liquids or other gases, and particularly to a portable instrument which can readily be used to make such measurements, as in ponds, streams, etc.

There are a large number of applications for a portable instrument which will give a direct read-out of the quantity of a gas in liquids or other gases. For example, various government agencies have a need for such an instrument to check lakes, ponds, or streams to determine whether the oxygen content is adequate for fish and other marine life, or to check periodically the oxygen content in streams into which industrial waste is being discharged. Other useful applications are in sewage plants and in industries which utilize fermentation tanks, in order to determine the amount of dissolved gas such as oxygen in such liquids, or to determine oxygen content in a closed room.

Accordingly, the present invention has for its primary object the provision of such an instrument which is of simple and sturdy construction, and which is easy to operate under field conditions.

Another object of the invention is to provide such an instrument, which in addition to measuring dissolved oxygen, also measures the temperature of the liquid.

A further object of the invention is to provide such an instrument which may be calibrated during its use, in order to maintain the required accurate read-out.

An additional object of the invention is to provide such an instrument, and a method of measuring oxygen content, in which the oxygen sensing probe is mounted and arranged in such a way that the instrument can be calibrated at the same temperature at which the measurement is to be made, prior to making the actual measurement.

Another object of the invention is to provide such an instrument in which it is possible to agitate the liquid in the region of the oxygen sensing probe, thereby to obtain an accurate reading without oxygen starvation at the probe.

Other objects and advantages of the invention will be apparent from the following description, the accompanying drawings and the appended claims.

In the drawings:

FIG. 1 is an elevational view of an oxygen analyzing instrument according to the invention, with the handle and associated parts broken to shorten the illustration;

FIG. 2 is a view similar to FIG. 1, with the float not shown, and with portions of the housing and supporting rods broken away and shown in section;

FIG. 3 is a view of the housing per se, showing the parts in a moved position to admit liquid to the interior of the housing and the locality of the polarographic oxygen probe;

FIG. 4 is a view of a modified form of housing, in which the atmospheric vent tube is removed and an expandable chamber is substituted for it;

FIG. 5 is a wiring diagram showing a suitable circuit arrangement for a portable, battery powered, transistorized circuit used in the instrument;

FIG. 6 is a representation of a suitable read-out chart; and

FIG. 7 is a view of a modification.

Referring to the drawings, which illustrate a preferred embodiment of the invention, the polarographic oxygen probe is shown generally at 10 in FIGS. 1, 2, 3, 4 and 7. This probe preferably is of a construction such as shown in the U.S. patent to Clark No. 2,913,386, and it functions by reducing oxygen which diffuses through its cover membrane 11 to the region of the electrodes in the interior of the probe. A variable current will thus flow through the circuit wire connections 12 to the probe, in relation to the oxygen in the liquid. The probe is suitably mounted, for example by being threaded, into a housing 15 in the form of an inverted cup, preferably metallic.

There are at least two openings or ports 16 in the open section of the housing, preferably about at the level of the probe sensing head within the housing whereby a flow of liquid can be induced past the probe when these ports are uncovered by any suitable means, a convenient cover means being a wide rubber or other elastic band 18 which can be placed around the upper section of the housing 15, and which will maintain itself under tension to form a tight liquid seal around the ports 16 preventing entrance of liquid into the housing.

The open bottom of the housing is normally covered by a removable cap 20, which may conveniently be a flexible rubber cap or the like having an internal ridge or bead 22 which fits into a corresponding peripheral slot in the lower part of the housing. Thus at the start of an operation the housing is liquid tight, and the only entrance thereto is provided through a vent tube 25 which is connected to a long vent pipe or conduit 26. A trigger hook 28, of stiff wire or some comparable material is engaged around the sealing band 18, and this band holds the hook tightly against the housing, as shown in FIGS. 1 and 2. This hook can be manipulated to release the band through a trigger wire or line 30, which may be formed of any suitable material, such as fish line or thin flexible wire.

The housing 15 has attached to it, for example brazed or welded, a mounting stud 32 having a threaded end 33 to which a supporting rod 35 is fastened. If desired, this rod may be provided in a number of sections, depending upon the depth to which it is desired to immerse the housing, however for purposes of illustration the rod is shown broken, it being understood that it may be of any convenient length.

At the upper end of the rod there is a handle 38 which is threaded or other wise secured to the supporting rod, and a bracket plate 40 is fastened between the handle and the end of the rod. A convenient arrangement for this purpose is shown in FIG. 2 where the plate 40 has an aperture receiving the threaded end 41 of the upper part of rod 35, and the handle 38 is threaded thereon. The upper end of the trigger line 30 is attached to the bracket 40, as shown at 42, such that it is convenient to the operator. Likewise, the circuit wire connections to the oxygen sensing probe 10, shown as the electrical cable 12, pass upward to the bracket 40 along with the circuit cable connections 45 to a temperature sensing element or probe 46 which is supported near the housing 15 with the cable 45 extending upward along the rod 35. In a preferred construction the cables 12 and 45 (being of course insulated) are held along the rod 35 with a suitable retainer such as a helical plastic strip, a portion of which is shown in FIG. 1, wrapped around these cables and an extending part of the bracket 40. This helical retainer is indicated by the general reference numeral 48.

FIG. 5 shows a suitable circuit for the instrument, including provisions for calibration, temperature measurement, and the oxygen concentration measurement. In the interest of portability and durability, a battery operated transistor circuit is provided, including the batteries 50, 51 and 52. The meter 55 is basically a galvanometer type instrument with appropriate scales to form direct reading of temperature and of oxygen concentration. This meter, as will be described, can be connected selectively to the temperature measuring circuit and to the oxygen concentration measuring circuit.

The temperature measuring circuit is basically a resistance bridge circuit indicated by the general reference numeral 60. In addition to the usual electrical resistances, and adjustable resistances for manufacturing calibration, this circuit includes a receptacle jack 62 into which the temperature probe cable 45 can be connected, and a temperature change compensating thermistor 63 for connection to the meter. A six section selector switch is provided to select the various functions of the instrument. This switch includes the sections 65, 66, 67, 68, 69 and 70, each one of which has five separate contact positions, labelled $a$, $b$, $c$, $d$ and $e$. The wipers of this switch are all shown at the $a$ position, in which the instrument is off.

It will be understood that the wipers are rotated together by a common operating knob and shaft, which is indicated schematically by the dot-dash lines 72. In the $b$ position, the bridge circuit 60 is calibrated, by appropriate adjustment of the potentiometer 73 to bring the needle of the meter 55 to a reference position (red line) as indicated at 74 on FIG. 6. This is generally referred to as battery calibration or drift compensation. Such an adjustment is desirable since the battery voltage may change during use of the instrument.

At the $c$ position of the selector switch the meter 55 is connected across the bridge circuit 60 through thermistor 63. The input from the temperature probe 46, to the input jack 62, is connected in one arm of the bridge circuit thereby causing a bridge unbalance which produces a corresponding temperature reading on the meter.

The input for oxygen concentration measurement is from a jack 75, to which the circuit lines 12 from the probe 10 are connected, through the wiper of the switch section 79. At the $b$, $c$ and $d$ positions power is supplied to the probe through the switch section 70, but this is only for warm up of the instrument. In the $d$ contact position the potentiometer 77 can be adjusted to compensate for any drift in the differential transistor amplifier circuit 80, which is the output amplifier for the oxygen concentration measuring part of the instrument. With the switch in the $d$ position, adjustment of potentiometer 77 will merely adjust the needle of the meter 55 to zero.

The fifth or $e$ position of the selector switch connects the jack 75, and thus the probe 10, to the calibrating potentiometer 82. In this position, as will be explained, the instrument is calibrated. Once this calibration is completed, the probe is then exposed to the liquid or gas to be tested and the meter 55 will give a direct reading, in the example, of oxygen concentration.

An adjustable float 85 is fastened to the main support rod 35, preferably by one or more elastic bands 86, and the position of this float may be changed along the support rod to locate the housing, and thus the polarographic and temperature probes, at a desired level within a liquid to be tested. If desired, suitable indication marks can be placed on the support rod 35, although these are not shown nor are they necessary to the operation.

Although the float 85 is not necessary, it is desirable for two purposes. First, and as noted above, it forms a convenient device to determine the extent of submergence of the housing 15. This is particularly useful if the operator might be standing a substantial distance above the stream or pond, for example on a foot bridge, and he finds it convenient to lower the instrument into the stream by means of a suitable line. The float is also desirable from the standpoint of protection, in case the rod and housing should be dropped into a large body of liquid, since it will have sufficient buoyancy to support these parts and they may easily be retrieved.

As the temperature measurement is being made, a power circuit is completed to the probe 10, and it undergoes a warm-up period, which includes the next normal step of "zeroing" or balancing the differential amplifier circuit at the contact $d$. The final calibration and oxygen concentration measurement is made by switching to the contact $e$, at which time the input of the differential amplifier is connected to the electrode 10 and the amplifier output is across the meter 55.

P.p.m. dissolved $O_2$ in water

One of the most common uses of this invention is in determining the amount of oxygen in water. The amount of oxygen which can be dissolved in water is a function of the temperature of the water. When water is saturated with oxygen the pressure of the dissolved oxygen is equal to the pressure of oxygen above the water. In this state of equilibrium, oxygen from the gas above the water enters the surface of the water at the same rate that dissolved oxygen escapes from the water into the gas above it. If the temperature rises more oxygen leaves the water than enters it from the gas—a new equilibrium is eventually established. Lowering the temperature permits more oxygen from the gas to become dissolved in the water until again pressure equilibrium is established.

The oxygen probe 10 is responsive to oxygen pressure. Thus if the chamber around the probe is full of water at the same temperature as the air above it, and the water is saturated with the air, the oxygen probe will produce the same current whether immersed in the water or exposed to the air above it.

The two currents will be the same at any temperature for a system where the water is saturated with the air above it. It is this characteristic of the polarographic sensor upon which the calibration techniques are based.

Tables are available which relate p.p.m. of oxygen dissolved in water saturated with air to the temperature of the water. A segment of such a table is reproduced as exemplary.

SOLUBILITY OF OXYGEN IN WATER (SATURATED WITH AIR) AT VARIOUS TEMPERATURES AND PRESSURES*

| P, inches | 30.51 | 29.92 | 29.53 | 28.54 | 27.56 | 26.57 | 25.59 | 24.61 |
|---|---|---|---|---|---|---|---|---|
| P, mm | 775 | 760 | 750 | 725 | 700 | 675 | 650 | 625 |
| T—° C.: | | | | | | | | |
| 0 | 14.9 | 14.6 | 14.4 | 13.9 | 13.4 | 13.0 | 12.5 | 12.0 |
| 1 | 14.5 | 14.2 | 14.0 | 13.6 | 13.1 | 12.6 | 12.1 | 11.7 |
| 2 | 14.1 | 13.8 | 13.6 | 13.2 | 12.7 | 12.3 | 11.8 | 11.4 |
| 3 | 13.7 | 13.4 | 13.2 | 12.8 | 12.3 | 11.9 | 11.5 | 11.1 |
| 4 | 13.4 | 13.1 | 12.9 | 12.5 | 12.1 | 11.6 | 11.2 | 10.8 |
| 5 | 13.0 | 12.8 | 12.6 | 12.2 | 11.8 | 11.3 | 10.9 | 10.5 |

*All values shown are for water in equilibrium with air saturated with water vapor.

Thus a sample of air at known pressure is brought to the temperature of the water, and the electrode current (measuring in air) will be the same as that obtained when the probe is dipped into the water if the water is saturated with air. Then refer to a table of values (such as mentioned above) to determine the p.p.m. calibration value, and then cause the meter to indicate this value using calibrating potentiometer 82.

The operator then pulls the trigger wire 30 to release the cover member 18, and liquid flows into the interior of housing 15 and around the membrane 11 of the oxygen sensing electrode 10. Preferably, especially where the liquid is a pool in which there is substantially no flow, the device is agitated by twisting the handle in a rotating manner to induce a flow of liquid through the ports 16. This flow is necessary since otherwise the electrode will deplete the oxygen from the liquid layer next to the cathode of the oxygen sensor and a condition of "oxygen starvation" will occur which will result in an incorrect reading.

After the measurement is made and the instrument removed from the liquid, cap 20 is removed to release the liquid from the housing and the trigger hook 28 and sealing band 18 are replaced.

By calibrating the instrument in the foregoing manner it is possible to obtain a direct reading of dissolved oxygen in parts per million, the range of a typical instrument as described being up to 25 p.p.m., with an accuracy of about 0.3 p.p.m. The reading is obtained directly from the meter chart, shown in FIG. 6.

Measuring percent saturation of $O_2$

By definition, percent saturation indicates the amount of oxygen dissolved in the water in relation to the amount of oxygen it could hold at the same conditions of temperature and pressure.

Air can be used for calibration for if the water is saturated with air it will contain 21% of the amount of oxygen it can hold at the same total pressure. On this basis 100% saturation would occur if the water was saturated with and in equilibrium with pure oxygen gas.

Previously it was pointed out that if the gas and saturated water were at the same temperature the oxygen electrode will give the same reading whether exposed to the gas or immersed in the water.

To effect calibration of the meter a sampler technique is used. Air for calibration is brought to the temperature of the water and the meter calibrated as in p.p.m. measurements, except now the meter is set to read 21%. No correction is needed for altitude or barometric pressure. The percent saturation measurement is a relative one; it indicates the amount present as a percentage of the maximum amount of oxygen that could be dissolved under the same conditions of temperature and pressure.

If it is desired to make a percent saturation measurement of the oxygen dissolved in water at a depth of several feet, the pressure of the water itself must be taken into account. For example, water at a depth of 5 feet is under $\frac{5}{32} \times 14.7 = 2.3$ p.s.i. more than at the surface (14.7 p.s.i.). The deeper the water the greater the amount of gas that can be dissolved in it To permit direct calibration of the instrument a modification of the sampler arrangement is employed. With reference to FIG. 4, the cap 20 is replaced by an expandable bag 88 of suitable material, such as polyethylene, and the vent 25 is closed by a plug 89 or the like. In this arrangement atmospheric air is trapped in the housing chamber and bag 88, and once the temperature reading is made, as previously, the calibration is accomplished by using this trapped air as a reference, which will be at the same temperature and under a corresponding pressure, to the surrounding liquid. In all other respects, this arrangement is of the same construction as previously described.

The unit is used as for p.p.m. measurement, but calibrates the meter at 21%. The polyethylene bag is flexible, hence collapses as the water pressure increases. The calibrating air at any depth has the same pressure as the water, and is of known composition. Thus, no correction need be applied to the indicated percent saturation value.

Oxygen content in gases

As previously mentioned, outdoor air or air within any reasonably ventilated building or enclosure can be assumed to contain 21% oxygen and thus provides a convenient reference to calibrate the instrument. Also, as mentioned, for accuracy, it is desirable that the temperature of the air used for calibration and the temperature of the gas to be tested be the same. The present invention also provides a sampler technique whereby the air used for calibration and the gas to be tested can be placed at the same temperature for calibration.

As shown in FIG. 7, the probe 10 can be removed from housing 15 and fitted with a protective guard 90. A small plastic bottle 92 is used to form the sampling chamber. This bottle has a removable cap 93 and has a hole in its bottom to fit snugly over guard 90, seating against the seal ring 95. Thus, this bottle merely provides a smaller housing surrounding the probe and separating it from the surrounding atmosphere. In practice, a bottle having a capacity of about one ounce has been successfully used.

To check the oxygen content of an area suspected to be other than normal, the instrument and probe unit is first taken to an area known to contain fresh air, for example, outdoors. Then the contents of the bottle are thoroughly flushed out, as by removing it, uncapping it, and waving it through the air, and then the bottle is placed over the end of probe 10 within the housing 15, trapping a quantity of calibrating air within the bottle. When the probe and instrument are taken into the measurement area, the meter is observed for a period until the oxygen indication thereon is steady, at which time the temperature of the calibration air within the bottle is the same as the surrounding atmosphere. At this time, the instrument is calibrated to cause the meter to read 21% oxygen, and then the bottle is removed and the probe is waved through the test area to assure that any remaining calibrated air is dispelled from the housing 15. Then, the meter will provide a direct oxygen content reading of the gas to which the probe is exposed.

It is also possible to modify this procedure and bring a sample of gas to be analyzed to the instrument. With this procedure, the instrument is standardized with the probe uncovered in fresh air at a given temperature, for example room temperature, and then attach the sample bottle 92 and admit the gas sample, flushing well to assure elimination of the calibrating air, then cap the bottle, and after temperature equilibrium has been reached, a reading is taken of the oxygen content of the unknown gas in the bottle.

The foregoing description has dealt chiefly with the measurement of oxygen concentration, but it will be apparent to those skilled in the art that other electrodes which have a varying sensitivity to other gases can be used in the same manner for the purpose of measuring concentration of such gases in fluids, liquid or gaseous. It should be understood, therefore, that while the invention has a specific application to the measurement of oxygen concentration, it also is broadly applicable to the measurement of concentration of other gases in fluids.

While the forms of apparatus herein described constitute preferred embodiments of the invention, it is to be understood that this invention is not limited to these precise forms of apparatus and that changes may be made therein without departing from the scope of the invention which is defined in the appended claims.

What is claimed is:

1. Apparatus for determining the concentration of oxygen in a fluid and for giving a direct read-out of such concentration, comprising a probe including a polarographic cell having spaced electrodes in an electrolyte and covered by an oxygen permeable membrane to provide a variable response to oxygen according to its concentration in a fluid exterior of said membrane, a normally closed housing forming a test chamber around said probe to isolate said probe from fluid to be tested, means extending from said housing for supporting said housing immersed in the fluid to be tested, selectively operable means associated with said housing for admitting fluid into said chamber after said housing is immersed therein, indicator means for providing a visual read-out of oxygen concentration, and circuit means connected between said indicator means and said cell for causing operation of said indicator means in relation to the variable response of said cell to presence of oxygen in the fluid.

2. Apparatus as defined in claim 1, wherein vent means are provided from said chamber for communication thereof with atmospheric air during immersion of said housing to expose said cell to air at the temperature of the fluid prior to admitting the fluid to said chamber.

3. Apparatus as defined in claim 1, including a temperature probe associated with said housing for sensing the temperature of fluid in which said housing is immersed, and a selectively operable connection between said temperature probe and said circuit means for producing a temperature reading on said indicator means.

4. Apparatus as defined in claim 1, including a selectively operable control incorporated in said circuit means for adjustment of the response of said indicator means according to a known response of said probe at a predetermined temperature.

5. Apparatus for testing the oxygen concentration in bodies of liquid, comprising
   an oxygen sensing device,
   a housing forming a chamber around said sensing device,
   a support rod extending from said housing,
   float means on said rod for buoyantly supporting the apparatus with said housing and at least a portion of said rod immersed in the liquid to be tested,
   a vent tube connected into said chamber and extending sufficiently therefrom to provide an atmospheric air vent for said chamber when said housing is immersed in liquid,
   selectively operable normally closed port means in said housing and operable when open to admit liquid into said chamber from the body of liquid in which said housing is immersed,
   a temperature probe associated with said housing for sensing the temperature of the liquid surrounding said housing,
   and indicator means connected to said oxygen sensing device and to said temperature probe for indicating the temperature and the oxygen content of the liquid.

6. A method of testing for oxygen concentration in a body of fluid using an oxygen sensitive polarographic cell, an indicator meter responsive to the reduction of oxygen in said cell and an electronic circuit connected between said meter and said cell and adjustable for compensation due to variation in response of said cell at different temperatures, comprising
   shielding the cell from the fluid to be tested and immersing the cell in such fluid,
   measuring the temperature of the fluid adjacent to the cell,
   calibrating the circuit with the cell exposed to atmospheric air while so immersed to set the meter for a direct read-out of oxygen concentration at the temperature of the fluid to be tested,
   and bringing said cell into contact with the fluid to obtain a direct reading on the meter of oxygen concentration in the fluid under test.

References Cited

UNITED STATES PATENTS

| | | | |
|---|---|---|---|
| 3,088,905 | 5/1963 | Glover | 204—195 |
| 3,196,100 | 7/1965 | Digby | 204—195 |
| 3,235,477 | 2/1966 | Keyser et al. | 204—195 |
| 3,260,656 | 7/1966 | Ross | 204—195 |
| 3,269,924 | 8/1966 | Nessler | 204—195 |
| 3,272,725 | 9/1966 | Garst | 204—195 |
| 3,275,541 | 9/1966 | Strong | 204—195 |
| 3,322,662 | 5/1967 | Mackereth | 204—195 |

JOHN H. MACK, *Primary Examiner.*

T. TUNG, *Assistant Examiner.*

U.S. Cl. X.R.

204—195